United States Patent
Tur

[15] 3,681,984
[45] Aug. 8, 1972

[54] SMALL SIGNAL AMPLIFIER PARTICULARLY FOR FLOW METER MONITORING

[72] Inventor: Charles J. Tur, Mequon, Wis.

[73] Assignee: A. O. Smith Corporation, Milwaukee, Wis.

[22] Filed: May 21, 1970

[21] Appl. No.: 39,352

[52] U.S. Cl. ............................73/194 R, 330/30 D
[51] Int. Cl. ...........................................G01f
[58] Field of Search ............73/194 R, 194 EM, 231; 330/30 R, 30 D, 14, 15; 324/140, 173, 174

[56] References Cited

UNITED STATES PATENTS

| | | |
|---|---|---|
| 3,562,660 | 2/1971 | Pease.....................330/30 D |
| 3,275,945 | 9/1966 | Walker et al. ...........330/30 D |
| 3,131,560 | 5/1964 | Cushman et al. ......73/194 EM |
| 3,339,410 | 9/1967 | Stern ....................72/194 EM |
| 3,185,932 | 5/1965 | Walker et al. ...........330/14 X |
| 3,305,729 | 2/1967 | Stein.......................330/14 X |
| 3,323,070 | 5/1967 | Hayes.........................330/15 |
| 3,434,069 | 3/1969 | Jones.......................330/30 D |

Primary Examiner—Charles A. Ruehl
Attorney—Andrus, Sceales, Starke and Sawall

[57] ABSTRACT

A monitoring system has a small signal amplifier to amplify the low millivolt signals of a remotely located flowmeter. A pair of transistors are mutually parallel connected in emitter follower configuration by a variable bias potentiometer to the meter through three terminals. Each transistor supplies an input to an analog comparator with resistive and capacitive feedback to provide common mode rejection with a single-ended output signal. An isolating transistor in common collector configuration is connected to the output of the analog comparator for impedance transformation.

The transistors are selectively connected to receive either a pair of balanced incoming signals or an unbalanced signal. A reference signal is applied as an input to one of the parallel connected transistors in unbalanced operation.

14 Claims, 2 Drawing Figures

PATENTED AUG 8 1972
3,681,984
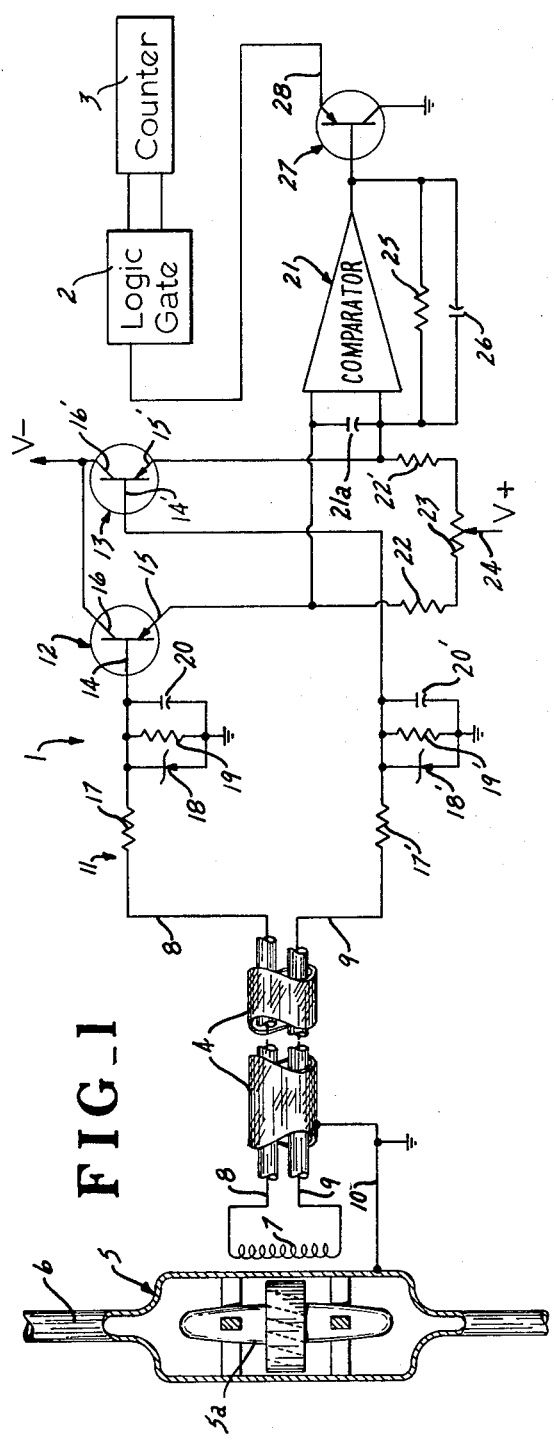
FIG_1
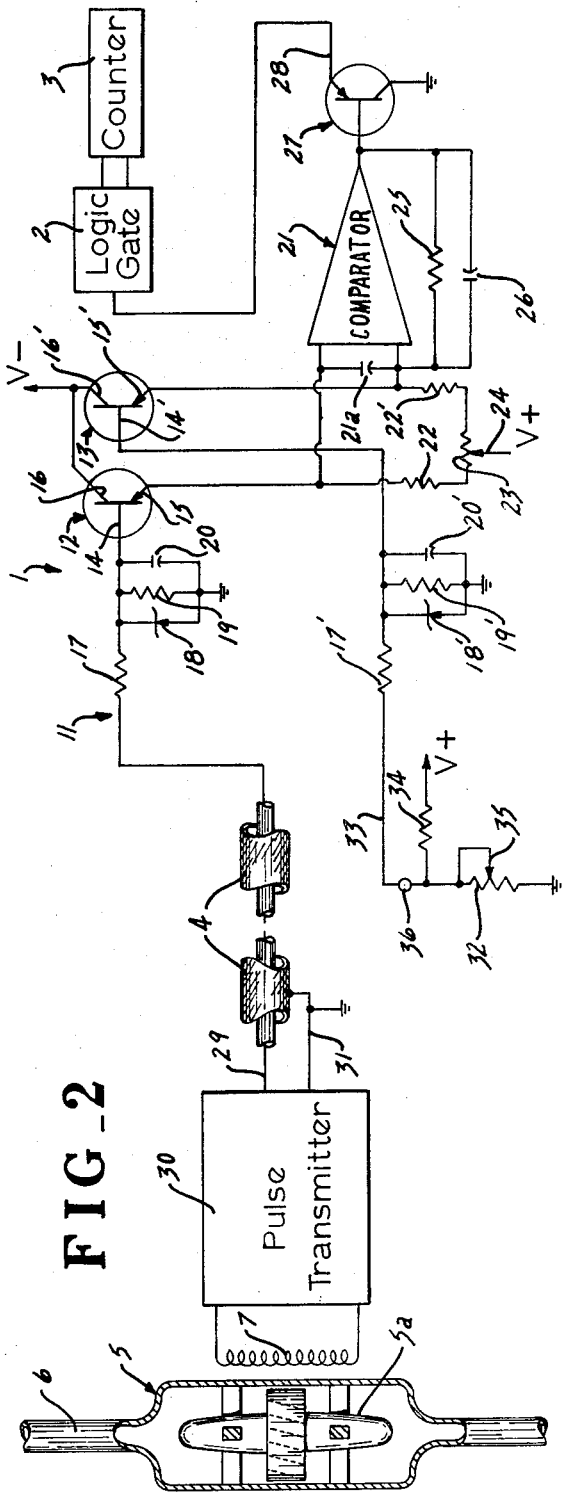
FIG_2
INVENTOR.
CHARLES J. TUR
BY
Andrus, Sceales, Starke & Sawall
Attorneys

SMALL SIGNAL AMPLIFIER PARTICULARLY FOR FLOW METER MONITORING

BACKGROUND OF THE INVENTION

This invention relates to a small signal amplifier capable of receiving balanced or unbalanced low millivolt signals transmitted from a remotely located flowmeter.

Analog comparators have been used to receive floating or differential inputs in balanced operation to provide an amplified single-ended or ground referenced output signal. Balanced floating input signals could be provided by transmissions received from a remotely located turbine flowmeter producing an A.C. output proportional to the speed of the turbine which is also proportional to the volumetric fluid flow through the fluid line, as shown in the patent to Erickson, U.S. Pat. No. 3,518,881, issued July 7, 1970 and assigned to a common assignee.

Because of balanced transistor amplifiers within the comparator, similar signals appearing as floating inputs should appear as similar signals at the output resulting in a zero difference output signal. Noise signals occurring during transmission and amplification will ideally occur identically at both floating inputs and be essentially eliminated by the comparative difference between signals.

Errors in output voltage, however, have occurred because of offset bias current and voltage inherently required by unbalanced conditions of the analog comparator. If not externally compensated, offset bias current and voltage is drawn from one floating input to cause output error in the comparative difference between signals.

Analog comparators capable of receiving balanced floating input signals have not been employed to receive an unbalanced signal from a remotely located meter because of the comparing nature of the comparator's operation. Such an unbalanced input signal could be provided by transmissions received from a turbine flowmeter transducer which generates a pulse output proportional to volumetric flow through a fluid line as shown in the patent to Houle, entitled Signal Transmitting Circuit for Remote Sensing of Petroleum Flow, U.S. Pat. No. 3,319,255, issued May 9, 1967 and owned by a common assignee. The analog comparator's low input impedance has also limited its use.

SUMMARY OF THE INVENTION

This invention relates to a small signal amplifier and particularly to such an amplifier capable of receiving balanced or unbalanced low millivolt signals transmitted from a remotely located flowmeter.

A pair of amplifying transistors are parallel connected in common circuit with a variable bias potentiometer to supply a pair of floating input signals to an analog comparator. The pair of transistors are selected for low offset input voltage and for high current gain compatible with the capabilities of the analog comparator.

The pair of amplifying transistor circuits further provide high input impedance and thereby reduce or essentially eliminate loading of the received transmitted signals due to current demand and further provide low output impedance which facilitates coupling to the analog comparator.

A variable bias potentiometer is connected in common with the pair of amplifying transistors and regulates the relative current flow between each transistor. Offset bias current and voltage, inherently required by analog comparators, is therefore provided by the unbalanced steady state current flow between transistors when connected as floating inputs to the comparator. Thus, by compensating the floating inputs through the variable bias potentiometer, offset bias current and voltage required by the comparator will not be supplied by the received signals and accurate comparison will occur between the two received amplified signals for optimum common mode rejection.

A further aspect of the invention for optimum operation provides a resistive and capacitive input circuit to each parallel connected amplifying transistor to supply high input impedance and provide an upper cut off frequency for the analog comparator. In like manner, a Zener diode is employed in the input circuit to act as a voltage clamp and supply input overdrive protection.

A reference signal source is selectively connected as part of the input circuit when receiving an unbalanced transmitted signal. A received unbalanced signal will be applied to one of the parallel connected transistors in accordance with the polarity of the received signal relative to the internal biasing of the analog comparator while a reference signal is supplied to the opposite parallel connected transistor. Thus, two floating inputs will be supplied to the analog comparator whose output will depend on the magnitude of the supplied reference signal.

In another aspect of the invention for optimum operation, a coupling capacitor is connected in common with the pair of amplifying transistors to short circuit the analog comparator's input when receiving high frequency noise, thereby protecting the comparator.

The analog comparator also employs a parallel connected resistive and capacitive feedback circuit to provide direct current stability with hysteresis to suppress noise while allowing high speed feedback response for input level changes. In particular, a feedback capacitor is provided which allows rapid feedback at very low frequencies.

A further aspect of the invention for optimum operation employs a common collector amplifying transistor to receive the single-ended analog comparator output signal and to supply a low impedance output signal compatible with electrical equipment used for measurement, control and the like.

BRIEF DESCRIPTION OF THE DRAWING

The drawing furnished herewith illustrates the best mode presently contemplated by the inventor and clearly discloses the above advantages and features as well as others that will be readily understood from the detailed description thereof.

In the drawing:

FIG. 1 is a schematic circuit of a monitoring system including a small signal amplifying circuit connected to receive a pair of balanced signals transmitted from a remotely located flowmeter; and FIG. 2 is a schematic circuit of the system of FIG. 1 connected to receive an unbalanced signal transmission from a remotely located flowmeter and including a reference signal source.

DESCRIPTION OF THE PREFERRED ILLUSTRATED EMBODIMENT

A preferred construction of a small signal amplifier 1, shown scehmatically in FIGS. 1 and 2, connects a logic gate 2 and recording meter 3 to a transmission line 4 and turbine flowmeter 5.

Turbine flowmeter 5 has an annular vane type rotor 5a within a fluid line 6 which rotates when subjected to fluid pressure flow. An A.C. generator or transducer 7 is coupled to turbine flowmeter 5 and magnetically responds to rotations of rotor 5a. Such rotations provide an alternating current output proportional to the speed of rotor 5a and therefore proportional to the volumetric fluid flow through line 6; for example, as shown in the patent to Erickson, U.S. Pat. No. 3,518,881, issued on July 7, 1970 and assigned to a common assignee.

As shown in FIG. 1, balanced signals produced by turbine flowmeter 5 are transmitted on conducting wires 8 and 9 through shielded transmission line 4 to the small signal amplifier 1. The shielding of transmission line 4 is grounded by a wire 10 to turbine flowmeter 5.

Transmission line 4 may also contain other wires, not shown, and may be connected to monitor several flowmeters simultaneously.

Small signal amplifier 1 is constructed in accordance with the teaching of the present invention to receive low millivolt signals with a multiple input circuit 11 connected to a pair of parallel connected transistors 12 and 13. The floating inputs from conducting wires 8 and 9 are connected to transistors 12 and 13 as follows.

The pair of parallel connected amplifying transistors 12 and 13 are connected in emitter follower configuration to receive the floating inputs from input circuit 11. Transistors 12 and 13 are chosen with nearly identical characteristics as practical or economical. However, it is not mandatory that their characteristics be exact for accurate operation. The operation of transistor 12 and associated circuitry will be described in detail only since transistor 13 operates in like manner and the corresponding circuitry of transistor 13 will be designated by prime numbers.

Transistor 12 is shown as a PNP type with a base 14, emitter 15 and collector 16. Base 14 is connected to input wire 8 through a series connected resistor 17 and to ground through a parallel connected Zener diode 18, resistor 19 and capacitor 20. Zener diode 18 provides input overdrive protection to the base-emitter junction of transistor 12 and subsequently to an analog comparator 21. Resistor 19 and capacitor 20 establish an upper cut off frequency while resistors 17 and 19 establish a high input impedance for small signal amplifier 1.

A positive voltage source is schematically shown by the legend "V+" and connected to emitters 15 and 15' through emitter resistors 22 and 22', respectively, and a common variable potentiometer 23. Specifically, variable potentiometer 23 connects the common ends of resistors 22 and 22' to voltage source "V+" through the tap 24 of potentiometer 23. The position of tap 24 inversely varies the resistance in the respective emitter circuits of transistors 12 and 13. Collectors 16 and 16' are mutually connected to the negative side of the voltage source schematically shown by the legend "V−."

In operation, a current path is established through transistor 12 from voltage source "V+" through tap 24, potentiometer 23, resistor 22, emitter 15, and collector 16 to voltage source "V−."

Transistor 13 operates in similar manner and the amount of current flowing in each branch is basically dependent upon the bias setting of variable potentiometer 23 and the input voltage signal supplied to bases 14 and 14'. A pair of floating outputs from transistors 12 and 13 are taken from emitters 15 and 15' in accordance with known emitter follower design and applied as floating inputs to analog comparator 21.

Analog comparator 21 is designed to compare two floating input signals and provide a single-ended output with common mode rejection. Comparator 21 includes a high gain amplifier of customary design well known to those skilled in the art and is therefore shown diagrammatically. In accordance with a further teaching of this invention, a parallel connected resistor 25 and capacitor 26 is connected in a feedback circuit to analog comparator 21. Applicant determined that the system without feedback encountered noise related hysteresis and inadequate response to input level changes. The R.C. feedback path provides direct current stability with hysteresis to suppress noise and also provides a high speed feedback response for input level changes, even at very low frequencies.

Offset bias current and voltage is inherently required by analog comparator 21 due to natural internal circuit inbalance. The parallel connected transistors have the relative steady state currents flowing in emitters 15 and 15' set by adjusting variable potentiometer 23 which in turn adjusts the steady-state floating input levels to comparator 21. This steady state compensation supplied by the pair of transistors 12 and 13 will prevent analog comparator 21 from drawing offset bias current and voltage from the transmitted floating signals and allow accurate comparison.

A coupling capacitor 21a is connected across emitters 15 and 15' and thus across the two floating inputs to analog comparator 21 to short circuit emitters 15 and 15' when high frequency noise is received. The short circuit function of capacitor 21a thereby protects the analog comparator 21 from possible damaging and disrupting high frequency noise.

The single-ended output of analog comparator 21 is supplied to an isolating or buffer transistor 27 illustrated as a grounded collector PNP type transistor. Transistor 27 provides a low impedance output signal compatible with most integrated logic circuits used for metering or control. Specifically, a single-ended output signal is taken from emitter 28 and supplied to logic gate 2 and counter 3. The output of logic gate 2 could be utilized in various control and indicating operations, such as indicating the rate of flow being sensed.

An unbalanced signal transmission is shown in FIG. 2 received and amplified by small signal amplifier 1. The unbalanced signal is transmitted on wire 29 from pulse transmitter 30 which converts an alternating current signal supplied by generator or transducer 7 into pulses indicative of the speed of rotor 5a and therefore indicative of volumetric fluid flow through line 6. Pulse transmitting circuits well known to those skilled in the art may be used, such as that shown in the patent to Houle, entitled Signal Transmitting Circuit for Remote Sensing of Petroleum Flow, U.S. Pat. No. 3,319,255, issued May 9, 1967 and owned by a common assignee.

In accordance with normal operating procedures, the shielding of transmission line 4 is grounded by connecting wire 31 to pulse transmitter 30. The unbalanced signal received on wire 29 is supplied as an input to small signal amplifier 1 to either transistor 12 or 13, depending upon the signal polarity of the incoming unbalanced signal relative to the biasing within analog comparator 21. A reference signal supplied by reference source 32 is supplied to the opposite transistor 12 or 13.

Reference signal source 32 is any suitable signal source. In FIG. 2, a D.C. voltage source is diagrammatically illustrated as "V+" and connected through wire 33 as an input to transistor 13. For optimum construction and operation, a variable voltage divider is employed to vary the magnitude of the reference signal and is shown by the connection of resistor 34 and variable resistor 35 in voltage divider arrangement. Specifically, resistor 34 is connected between voltage source "V+" and output point 36 while resistor 35 is connected between ground and output point 36. Adjustment of the reference signal supplied from source 32 produces a minimum voltage level at emitter 15' which supplies an input to analog comparator 21 to be compared to the input supplied by the unbalanced signal at emitter 15. A minumum input comparing level supplied by source 32 is used to eliminate unwanted noise associated with the unbalanced signal in a manner analogous to balanced operation which allows optimum signal detection.

The present invention provides a highly satisfactory and reliable small signal amplifier capable of receiving low millivolt signals received from remotely located turbine flowmeters and employing common mode rejection in balanced operation while permitting convenient adaptation for unbalanced operation with essentially identical amplification circuitry.

Various modes of carrying out the invention are contemplated as being within the scope of the following claims particularly pointing out and distinctly claiming the subject matter which is regarded as the invention.

I claim:

1. A small signal amplifying circuit for differentially amplifying a pair of low voltage signals with rejection of common mode voltage signals appearing on said low voltage signals, comprising
   a signal source means establishing said pair of low voltage signals and including a transducer for establishing at least one of said low voltage signals as a variable signal to be detected,
   a first and a second high input impedance means connected to the source means and each receiving one of said pair of low voltage signals and the corresponding common mode voltage signal,
   a first and a second amplifying transistor each connected in an open loop amplifying circuit to said first and second high input impedance means respectively to receive said two input voltage signals and said common mode voltage signals and to establish a pair of output signals including both said input voltage signals and said common mode voltage signals received from said first and second impedance means, and
   an analog comparator means responsive to the difference voltage and having a first input means connected to said first amplifying transistor and a second input means connected to said second amplifying transistor for combining said pair of output signals supplied by said first and second amplifying transistors and constituting the means for rejecting said common mode voltages with said common mode voltages rejected at the first and second input means and providing a differential comparison between said pair of output signals to supply a single-ended output.

2. The small signal amplifying circuit of claim 1, including an adjustable potentiometer connected to a bias voltage source and connected in common to said first and second amplifying transistors to inversely vary the bias of said first and second amplifying transistors and provide offset bias current and voltage to said analog comparator means to allow accurate common mode rejection.

3. The circuit of claim 1 wherein said signal source includes,
   a reference signal means connected to the other of said first and second high input impedance means to supply a reference signal from that of the transducer as the second low voltage signal in unbalanced operation.

4. The circuit of claim 1 including,
   a flow metering means and said transducer means connected to said metering means to establish an output signal proportional to flow, and
   connecting means to selectively connect said transducer means to at least one of said first and second high input impedance means.

5. The circuit of claim 4, wherein said connecting means is connected to both of said first and second high input impedance means to supply a pair of signals indicative of flow rate in balanced operation.

6. The circuit of claim 4 wherein,
   said signal source means includes a reference signal means selectively connected to one of said first and second high input impedance means to supply a reference signal, said connecting means selectively connected to the opposite of said first and second high input impedance means to supply a signal indicative of flow rate in unbalanced operation.

7. The circuit of claim 6, wherein said reference signal means includes a voltage source connected through a variable resistive voltage divider to supply a reference signal.

8. The circuit of claim 1, wherein said first and second high input impedance means each includes a resistor serially connected to a parallel connected resistor, capacitor and Zener diode to supply high input impedance, establish an upper cutoff frequency, and provide overdrive protection for said small signal amplifying circuit.

9. The circuit of claim 1, wherein said analog comparator means employs a parallel connected resistive and capacitive feedback circuit to provide direct current stability with hysteresis to suppress noise and allow high speed feedback response to signal level changes.

10. The circuit of claim 1 including a coupling capacitor connected to said first and second input means of said analog comparator means to short circuit said first and second input means when receiving high frequency noise.

11. The circuit of claim 1 and including an impedance transformation means connected to said analog comparator means and having a low output impedance to allow matching of said small signal amplifying circuit with succeeding circuitry.

12. A small signal amplifying circuit for amplifying low voltage signals received from a remotely located flowmeter, comprising a first and a second input means including a resistor serially connected to a parallel connected resistor, capacitor and Zener diode to supply high input impedance, establish an upper cutoff frequency, and provide overdrive protection for said small signal amplifying circuit, a first and a second amplifying transistor connected in common emitter configuration and connected to said first and second input means respectively to receive at least one low voltage signal and to establish a pair of output signals, an analog comparator means including parallel connected resistive and capacitive feedback circuit to provide direct current stability with hysteresis to suppress noise and allow high speed feedback response to signal level changes, and including a first input means connected to said first amplifying transistor and a second input means connected to said second amplifying transistor to combine said pair of output signals supplied by said first and second amplifying transistors with a coupling capacitor connecting said first and second input means to short circuit when receiving high frequency noise, and an adjustable potentiometer with a center tap connected to a bias voltage source, said adjustable potentiometer connected through a pair of emitter resistors to said first and second amplifying transistors to inversely vary the bias of said first and second amplifying transistors and provide offset bias current and voltage to said analog comparator means to allow accurate common mode rejection.

13. The small signal amplifier of claim 12, including a transducer means connected to said flowmeter to establish an output signal indicative of flow rate, connecting means connected to said transducer means and to said first input means to supply a flow indicative signal, and a reference signal means including a voltage source selectively connected through a variable resistive voltage divider to said second input means to supply a reference signal in unbalanced operation.

14. The small signal amplifier of claim 12, including a transducer means connected to said flowmeter to establish a pair of output signals indicative of flow rate, and connecting means connected to said transducer means and to said first and second input means to supply a pair of flow indicative signals in balanced operation.

* * * * *